United States Patent Office 2,906,733
Patented Sept. 29, 1959

2,906,733

STABILIZATION OF POLYETHYLENE DURING SHUT-DOWN OF MOLDING APPARATUS

William H. Rader, Champaign, and Howard L. Wilson, Arcola, Ill., assignors to National Petro-Chemicals Corporation, New York, N.Y., a corporation of Delaware No Drawing. Application January 16, 1957
Serial No. 634,405

5 Claims. (Cl. 260—45.95)

The present invention relates to an improvement in elevated temperature, pressure forming of solid polyethylene compositions and, more particularly, to an improvement wherein the forming surfaces, as for example in injection molding and extrusion apparatus, are treated to inhibit, during shut-down operations, undesirable resinification of residual polyethylene compositions feed adhering to the forming surfaces of such apparatus. By practice of the invention as described more fully hereinafter, difficulties normally encountered upon resumption of the forming operation following shut-down are markedly reduced or obviated. Such difficulties include contamination of the formed polyethylene product with objectionable particles of colored, resinified particles, improperly formed products, and extended periods of time requirements before the start-up operation, following a shut-down, reaches a production stage without exceeding a normal percentage of product rejects for the particular forming operation.

As those skilled in the art are aware, methods including injection molding and extrusion are commonly employed for forming polyethylene articles. In such methods, a solid polyethylene composition such as in the form of granules, pellets, shot, etc., are introduced in an injection molding or extrusion apparatus and, by means of a combination of elevated temperature (e.g., 250–650° F.) and pressure (e.g., 200–20,000 p.s.i.), the formation of polyethylene articles of defined shape is effected. For such a purpose, the polyethylene composition may consist essentially of virgin polyethylene or a polyethylene containing an additive substance, or plurality thereof, such for example as a substance to inhibit oxidation.

In the use for such forming operations of a virgin polyethylene or polyethylene containing concentration of an anti-oxidant normally sufficient to satisfactorily inhibit the resulting polyethylene article against objectionable oxidation at temperatures of intended usage of such articles, it has been found that upon resumption of the forming operations following a shut-down, difficulties such as aforedefined are normally encountered thereby resulting in extensive losses due to excessive production of off-quality products, extensive time period requirements before reaching a normal production stage, and the like. The primary object of this invention is to provide a method whereby such difficulties normally encountered following resumption of the forming operations after a shutdown are obviated or substantially minimized.

The invention embodied herein and which provides improved results, reflected mainly by a marked reduction in off-quality polyethylene articles and time requirements for reaching a normal production stage following a shut-down, comprises applying to the forming surfaces of the forming apparatus, prior to a reduction thereof to a temperature substantially lower than normal operating temperature, of a polyethylene composition substantially more highly inhibited against oxidation than the polyethylene composition feed for the particular forming operation. Thus, in an embodiment, and immediately before shut-down of the forming operations, the forming surface of the forming apparatus are purged by replacing the normal polyethylene feed with a polyethylene containing a substantially more highly oxidation-inhibited polyethylene than the normal feed. Such a procedure results in providing on the forming surfaces a coating of relatively more highly anti-oxidation inhibited composition which thereby inhibits undesired resinificaton of residual normal polyethylene feed adhering to said surfaces and obviates or minimizes the aforesaid difficulties normally encountered upon resumption of the forming operation following a shut-down. Although such a method comprises a particularly practical embodiment for carrying out this invention, other suitable methods for providing such a coating on the forming surfaces may be employed but, in general and to obtain optimum results, the coating should be applied to the forming surfaces of the apparatus before the temperature of such surfaces is substantially reduced below normal operating temperatures. For example, and although the coating is preferably applied to the forming surfaces while at normal operating temperature, some temperature reduction may be tolerated. Generally, however, the coating is applied before a temperature reduction of more than about 30° F., below the normal operating temperature, is attained on shut-down although, depending on the magnitude of the normal operating temperature for a particular forming operation, a temperature reduction of more than about 30° F. may be allowed to occur before the coating is applied. In any event, and depending upon the particular feed composition for the production phase of the forming operation, the coating is applied to the forming surfaces either immediately prior to shut-down while the temperature of the forming surfaces are still at, or maintained at, normal operating temperature, or while the temperature of the forming surfaces are still at a temperature sufficiently high as to cause accelerated resinification, such as that due to oxidation, of the residual feed on the forming surfaces.

With reference to the anti-oxidant utilized for providing the desired inhibition of resinification of the residual polyethylene composition on the forming surfaces, the invention broadly relates to use of any substance that inhibits oxidation of polyethylene, inclusive of many substances known to those skilled in the art. As examples of suitable oxidation-inhibitors for polyethylene are alkylated phenols such as butylated alkyl phenols and specifically 2,6-di-tert. butyl-4-methylphenol, certain gallates such as propyl gallate, lauryl gallate, and the like, sulfides such as 4,4'-thiobis(6-tert. butyl-m-cresol), 4,4'-butylidenebis(6-tert. butyl-m-cresol), and others.

As to the concentration of the anti-oxidant to employ in the polyethylene composition for the coating operation, it depends mainly upon the effectiveness of the particular anti-oxidant employed. Whether the normal feed consists of virgin polyethylene, or a polyethylene composition devoid of an anti-oxidant, or a polyethylene containing an anti-oxidant, the invention is carried out by use for the described coating operation of a polyethylene composition more highly inhibited against oxidation than the normal feed material. In instances wherein the normal feed contains an anti-oxidant different than that desired for use as the coating material, the particular concentration to employ of the anti-oxidant in the coating material is such as to provide a substantially higher degree of inhibition against oxidation than is provided by the anti-oxidant in the feed material. Generally, however, usage is made of the same anti-oxidant for the coating material as is used in the normal feed to the forming operation whereby a substantially larger concentration of the anti-oxidant is used in the coating composition than is present in the normal feed to the forming operation. In general, the coating composition may contain from about 0.001 to about 2.0% by weight of anti-oxidant, the particular amount in said range actually employed being dependent on the effectiveness of the anti-oxidant and, in the use of the same anti-oxidant in the coating material as is used in the normal feed, a substantially higher amount is used in the coating material as, for example, from about two to about thirty times as much and preferably about ten to twenty-five times the concentration in the normal feed. In a specific embodiment, and in the use of a normal feed containing about 50 parts/million of 2,6-di-tert.-butyl-4-methylphenol, particularly suitable results are obtained by use, in the coating composition, of from about 500–1500 parts/million of the anti-oxidant. In general, however, the particular anti-oxidant and its concentration employed in the coating operation is such that it will inhibit resinification of residual normal feed adhering to the forming surfaces against the resinification-inducing elevated temperatures that exist upon shut-down of the forming apparatus as well as against the elevated, resinification-inducing temperatures that are reached in the heating up of the apparatus to normal operating temperature upon resumption of the forming operation following a shut-down.

In order to further describe the invention, the following embodiments are set forth for purposes of illustration and not limitation.

*Example 1*

(a) In an injection molding process carried out with a molding cycle of 35 seconds at 430° F. and pressure of 6,000 p.s.i., a polyethylene molding resin is used containing 50 parts/million of 2,6-di-tert.-butyl-4-methylphenol (anti-oxidant), said feed having been prepared by mixing fused pellets of the polyethylene with the anti-oxidant.

Under such conditions, normal operation of the injection molding process results in reject product (polyethylene articles) amounting to from 3 to 5%. Following a 48 hour shut-down, during which the apparatus cooled to room temperature, and without removing the residual polyethylene feed in the injection molding-heating cylinder, the forming operation was resumed at the aforesaid conditions of temperature, pressure and molding cycle. At the start of the start-up, reject product amounted to about 75%; to about 50% at the end of one hour; and normal operation with 3–5% rejects did not occur until about 4 hours.

(b) The injection molding process was carried out under the conditions set forth in the first part of this example with the exception that, prior to the shut-down, the operation was carried out by use of a feed comprising the polyethylene molding-resin containing 1000 parts/million (0.1%) of the same anti-oxidant. Following the 48 hour shut-down, and resumption of the molding process, normal operation (3–5% rejects) was attained within one hour.

*Example 2*

(a) An extrusion process was carried out using a film quality polyethylene containing 50 parts/million of the anti-oxidant used in Example 1, the extrusion being carried out at 300° F. Following a 30 hour shut-down during which the apparatus had cooled to room temperature, the operation was resumed with occurrence of higher than normal production interruptions due to breakage of film product as a result of contamination with resinified polyethylene particles. Such breakages occurred at about 3 to 4 breaks/hour for the first hour and gradually diminished thereafter but normal production (about one break/16 hours) was not reached until 8 hours of operation following resumption of the operation.

(b) The extrusion process was carried out under the conditions set forth in the first part of this example with the exception that, prior to the shut-down, the operation was carried out with a feed comprising the film quality polyethylene containing 1000 parts/million of the anti-oxidant. Upon resumption of the process following the 30 hour shut-down, normal operation resulted as breakage did not occur in excess of about one break per 16 hours of operation.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. In a process wherein a solid polyethylene production composition substantially devoid of an oxidation-inhibitor is fed to a forming zone and is subjected therein to a combination of operating conditions including an elevated temperature and pressure to form polyethylene articles of desired form without substantial contamination of said articles by resinified particles of polyethylene, and resumption of said process following a shut-down results in objectionable contamination of the polyethylene articles by resinified particles of polyethylene formed in said forming zone during said shut-down which includes a period of temperature reduction in the forming zone to substantially below operating temperature with subsequent increase of the forming zone to substantially operating temperature, the improvement which comprises, prior to substantial reduction of said forming zone during said shut-down to a temperature substantially below operating temperature, replacing said production feed to said zone with a solid polyethylene replacement composition containing a phenolic oxidation inhibitor in an amount of up to about 2%, by weight of the polyethylene in the replacement feed, sufficient to inhibit resinification of residual polyethylene in said forming zone during said shut-down.

2. A process, as defined in claim 1, wherein the replacement polyethylene composition is inhibited with 2,6-di-tert-butyl-4-methyl phenol.

3. In a process wherein a solid polyethylene production composition containing an anti-oxidant for polyethylene is fed to a forming zone and is subjected therein to a combination of operating conditions including an elevated temperature and pressure to form polyethylene articles of desired form without substantial contamination of said articles by resinified particles of polyethylene, and resumption of said process following a shut-down results in objectionable contamination of the polyethylene articles by resinified particles of polyethylene formed in said forming zone during the shut-down which includes a period of temperature reduction in the forming zone to substantially below operating temperature with subsequent increase of the forming zone to substantially operating temperature, the improvement which comprises, prior to substantial reduction of said forming zone during said shut-down to a temperature substantially below operating temperature, replacing said production feed to said zone with a solid polyethylene replacement composition containing a phenolic oxidation inhibitor for polyethylene in an amount of from about ten to twenty-five times larger than the anti-oxidant present in the production feed to inhibit resinification of residual polyethylene in said forming zone during said shut-down period, said replacement feed being characterized by containing said phenolic anti-oxidant in an amount not in excess of about 2% based on the weight of polyethylene in said replacement feed.

4. A process, as defined in claim 3, wherein the same anti-oxidant is present in the production composition as is present in the polyethylene composition with which it is replaced.

5. A process, as defined in claim 3, wherein the anti-oxidant in the replacement composition is 2,6-di-tert-butyl-4-methyl phenol.

References Cited in the file of this patent

Raff et al.: "Polyethylene," page 106, Interscience (1956).